United States Patent [19]

Engel et al.

[11] Patent Number: 4,714,275

[45] Date of Patent: Dec. 22, 1987

[54] TOY STICKER COLLECTION ALBUM AND COLLECTIBLE STICKERS THEREFOR

[75] Inventors: James E. Engel, Lombard; Sidney Diamond, Chicago, both of Ill.

[73] Assignee: Diamond Publishing, Niles, Ill.

[21] Appl. No.: 923,764

[22] Filed: Oct. 27, 1986

[51] Int. Cl.$^4$ .......................... B42D 1/00; G09F 1/10; G02B 27/22; G09B 11/06

[52] U.S. Cl. .................................. 281/15 R; 40/152.1; 350/132; 434/178

[58] Field of Search ....................... 281/15 R; 283/903; 434/119, 178; 350/132, 311, 315, 316, 317; 40/152, 152.1; D19/26

[56] References Cited

U.S. PATENT DOCUMENTS

| | | | |
|---|---|---|---|
| 864,984 | 8/1907 | McPhee | 281/15 R |
| 1,422,527 | 7/1922 | Berger | 350/132 |
| 2,384,149 | 9/1945 | Zadig | 352/87 |
| 2,623,433 | 12/1952 | Stipek | 350/132 |
| 2,647,440 | 8/1953 | Rehorn | 350/132 |
| 2,720,722 | 1/1954 | Hiser | 350/132 |
| 2,906,170 | 9/1959 | Kiehl et al. | 350/140 |
| 3,756,699 | 9/1973 | Martin | 350/140 |
| 4,167,241 | 9/1979 | Zumbrunn | 40/152.1 |

FOREIGN PATENT DOCUMENTS

| | | | |
|---|---|---|---|
| 768040 | 9/1967 | Canada | 283/903 |
| 1240094 | 7/1960 | France | 281/15 R |
| 502195 | 3/1939 | United Kingdom | 434/178 |
| 2072580 | 10/1981 | United Kingdom | 281/15 R |

OTHER PUBLICATIONS

TM 1984 World Events Production Ltd., (Voltron Sticker Album).

*Primary Examiner*—E. R. Kazenzke
*Assistant Examiner*—Paul M. Heyrana, Sr.
*Attorney, Agent, or Firm*—Ronald B. Coolley

[57] ABSTRACT

An album includes a full color cover and a number of pages secured therein. Also secured within the album is a removable cardboard viewer including a tinted transparent filter. A flap is provided that serves as a handle for the viewer. The viewer also includes a tear away area containing a check list with numbers corresponding to each sticker that may be collected and secured in the album. Printed throughout the album pages are sequentially numbered boxes corresponding in size and number to full color, self adhesive stickers which are purchased separately from the album. A story line is also printed under a number of the designated boxes describing a story portrayed on the sticker. Printed within a number of these boxes is a photographic half tone image of the full color images on a corresponding sticker. All the photographic half tone images throughout the album are printed in a first color. Printed over all the half tone images in a second color is a patterned design which has the effect of camouflaging or obscuring the photographic half tone images. The tinted filter is similar in color to the second color. When the filter is placed over the photograhic half tone image, the image appears for viewing. In addition to the photographic half tone images throughout the album, a number of puzzles or other activities that work by use of the viewer are placed throughout the pages of the album therefore making the album an activity book in addition to a sticker collection album.

15 Claims, 7 Drawing Figures

FIG. 1
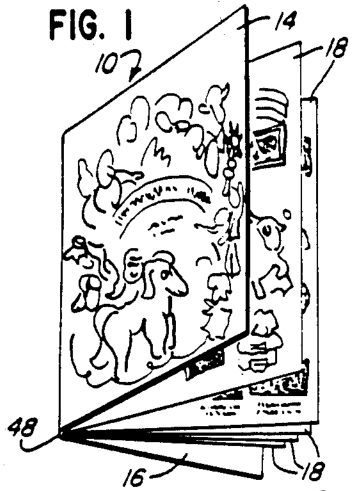
FIG. 2
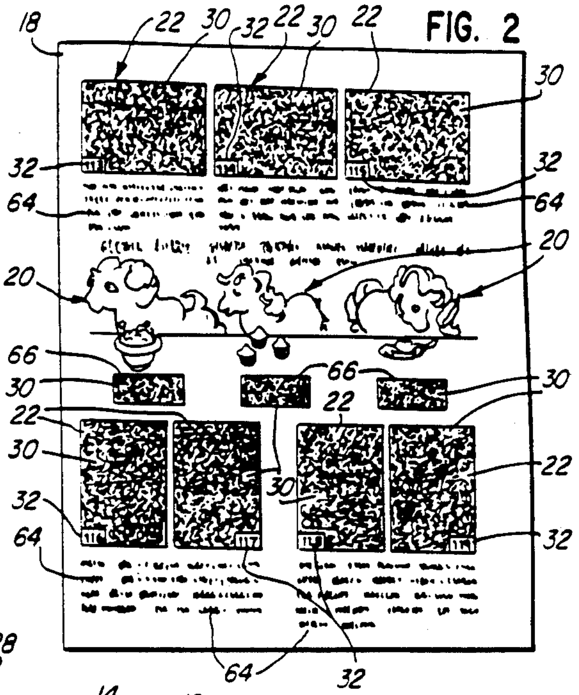
FIG. 3
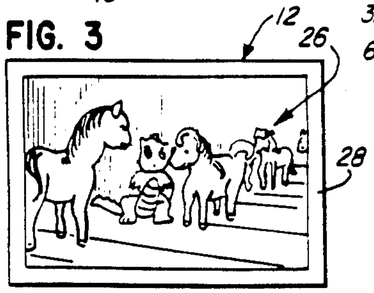
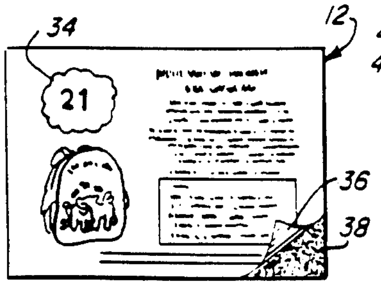
FIG. 4
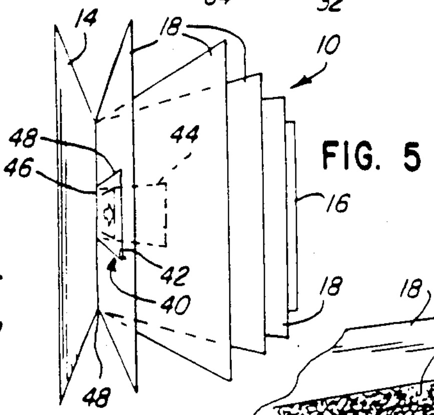
FIG. 5
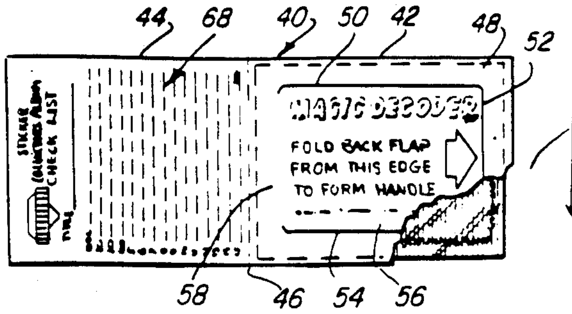
FIG. 6
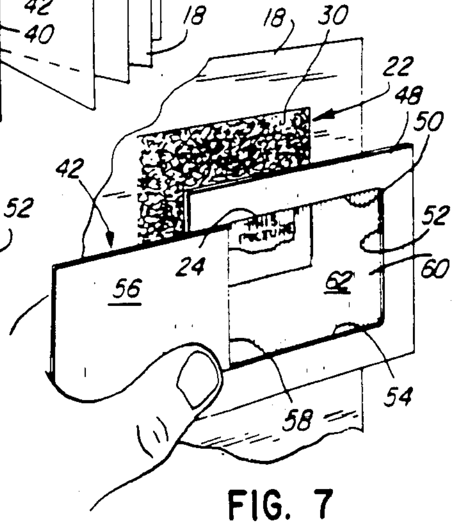
FIG. 7

TOY STICKER COLLECTION ALBUM AND COLLECTIBLE STICKERS THEREFOR

BACKGROUND OF THE INVENTION

A. Field of the Invention

The present invention generally relates to a sticker collection album; and, more specifically, to a sticker collection album that includes an entertaining feature including disguised or camouflaged areas for puzzles or stickers that can only be viewed through the use of a decoder or viewer, and further including a checklist that records stickers collected and stickers still to be collected.

B. Description of the Background Art

A popular hobby with children is collecting theme stickers and mounting them in an album. Children who have seen a cartoon or movie or who have favorite toys enjoy collecting stickers bearing illustrations of their favorite cartoon or movie characters or toys. These stickers are mounted in albums which the child keeps and periodically examines.

It has been discovered that the present product provides the following entertaining features: purchasing packets of stickers which upon opening contain the surprise element of finding randomly assorted numbered stickers for a specific album, matching and mounting the numbered stickers to the corresponding numbered rectangular blank spaces within the album, trading excess duplicate stickers with other collectors in order to complete the albums, and finally reading the story line printed under each illustrated sticker throughout the album.

When each collection is completed these albums provide a full color illustrated story book. The albums generally accommodate 200 to 240 stickers per collection. It has been discovered however that the average number of stickers collected in each album is approximately sixty. Once these sixty stickers have been collected the child loses interest in the album and no longer attempts to complete the collection. In addition, albums have not provided a child with a removable check list so that his trading activities can be conducted away from where he stores his album.

There are albums available with words printed in the albums beneath locations for stickers. The words tell a story and each sticker bears an illustration that is part of the story. Each sticker is secured over the proper location in the album. The proper location is typically identified by a number adjacent the location. This number corresponds to an identical number on the sticker that is to be secured on that location. As a child collects and secures stickers in the album, the story comes to life in full color and an attractive story book is created.

These albums provide the entertaining feature of a full color story book once all stickers have been collected. It has been discovered, however, that once all stickers have been collected and secured in the album, the child soon loses interest in the toy. It has also been learned that a child who owns an album does not have any means included with the album for keeping a record of which stickers have been collected and which stickers still have to be obtained.

There are also books available that include line drawings printed in a first color on pages of the books and patterns printed in a second color over the line drawings. A sheet of cellophane tinted substantially the same color as the second color is provided with the book. By placing the sheet of cellophane over the patterns, the line drawings can be seen. In these books no stickers are provided or even contemplated.

It is desirable to provide an album that provides additional entertainment to that provided by available albums and provides a challenge and additional play value to the child. A sticker album that allows a child a "sneak peek" at stickers not yet collected creating anticipation of obtaining stickers not yet collected, and providing the child with access to the image of stickers not yet collected is also desirable. A device allowing the child to record what stickers have been collected is another desirable feature.

SUMMARY OF THE INVENTION

An object of the present invention is to provide a new and improved toy.

Another object of the present invention is to provide a new and improved toy sticker collection album.

A further object of the present invention is to provide a new and improved toy sticker album that provides a challenge to a child using the album by requiring the use of a decoder.

A still further object of the present invention is to provide a new and improved sticker album that includes a portable device listing all stickers required to complete the album and for recording the stickers collected thereby allowing stickers to be traded in order to complete the album.

Briefly, the present invention is directed to a new and improved toy sticker album that provides an entertaining challenge to the owner of the album and encourages trading stickers. The album of the present invention includes a cover with a plurality of pages secured in the cover. Each page includes at least one photographic half tone image printed in a first color. Screened line drawings may also be printed in the first color on each page. To prevent seeing the drawing without a viewing device, a pattern is printed over each pictorial half tone image and screened line drawing. The pattern is printed in a second color that is of a tone or color to obscure the photographic half tone images and the screened line drawings making it difficult to see the images and drawings with the unaided eye. If desired, a designation such as a sequential number or letter may be printed adjacent each pattern.

A plurality of stickers are also provided separately from the album. The stickers are purchased and secured to the pages of the album by adhesive on one side of each sticker. Each sticker includes a full color illustration on a side opposite the side with adhesive. Each full color illustration may be a still from a movie or television program, or a popular cartoon or event. Each full color illustration corresponds to one of the photographic half tone images in the album. A designation corresponding to one of the designations adjacent the patterns may also be provided on the sticker.

To locate the proper photographic half tone image corresponding to the illustration on one of the stickers, the child may match the designation number adjacent the drawing with the designation or number on the sticker. A more challenging location procedure, however, is to use a decoder provided with the album. The decoder includes a frame removably secured in the album. The frame includes first and second portions separable from each other. The first portion includes a handle and a transparent film such as cellophane. The film is tinted substantially the same color as the color of the patterns in the album. By placing the film over any of the patterns in the album, the color of the pattern is filtered out by the film and the color of the photographic half tone image or screened line drawing below the pattern is enhanced. While a child viewing the album when purchased cannot see the photographic half tone image over which the corresponding sticker should be secured, by using the decoder, the child can see the image and select the proper sticker to place over that location in the album. A child can also review his or her album using the film to determine which stickers must still be collected. A child who cannot read or count may use the album of the present invention by ignoring the designations adjacent each photographic half tone image and matching the correct sticker with each image using the decoder.

The decoder also allows a child a "sneak peek" at stickers the child has not yet collected. This "sneak peek" creates anticipation of getting scenes from a story in the full color form. Even without stickers, the album has play value since if the album is not completed, the child still has access through the decoder to the photographic half tone image corresponding to the full color illustration on the sticker. Screened line drawings and printed words also provide play value before, during and after collection of all the stickers since line drawings and printed words may be answers to questions, parts of puzzles or parts of drawings. These screened line drawings can be viewed at any time using the decoder.

The second portion of the decoder frame includes a complete list of all of the designations in the album. In effect, this is a list of all the stickers that must be collected for the album. This portion of the frame may be a card that the child may carry. The child crosses off the designations on the card for the stickers already collected. This card may be carried by the child and referred to during future purchases or trading sessions with friends allowing the child to trade stickers to complete his or her album. This card also adds an entertaining aspect to the album.

BRIEF DESCRIPTION OF THE DRAWINGS

The above and other objects, advantages and novel features of the present invention will become apparent from the following detailed description of the preferred embodiment of the present invention illustrated in the accompanying drawings wherein:

FIG. 1 depicts a toy sticker collection album including locations for attaching stickers and a device for finding the locations constructed in accordance with the principles of the present invention;

FIG. 2 is an enlarged, plan view of a page in the sticker album illustrated in FIG. 1;

FIG. 3 is an enlarged, plan view of a front side of a sticker that may be secured to the page illustrated in FIG. 2;

FIG. 4 is an enlarged, plan view of the back of the sticker illustrated in FIG. 3;

FIG. 5 is a perspective view of the sticker album illustrated in FIG. 1 illustrating the position in the album of a viewing device constructed in accordance with the principles of the present invention;

FIG. 6 is an enlarged, plan view of the viewing device; and

FIG. 7 is a fragmentary view illustrating the proper use of the device for viewing photographic half tone images and screened line drawings on the pages of the album of the present invention.

DESCRIPTION OF THE PREFERRED EMBODIMENT

Referring to the drawings and initially to FIGS. 1 and 5, there is illustrated a sticker collection album generally designated by the reference numeral 10. Album 10 is purchased by a child. A package of individual stickers 12 (FIGS. 3 and 4) is also purchased. By mounting stickers 12 in album 10, a child collects a series of stickers 12. Trading of stickers is also possible. Once a complete set or series of stickers 12 is collected and mounted in album 10, the child may read album 10 the same as reading a book. As described in the following paragraphs, album 10 provides entertainment not available in prior art albums by encouraging collection and trading of stickers 12 and providing play value before, during and after collection of all of the stickers 12. Album 10 includes a front cover 14 and a back cover 16. Mounted between front cover 14 and back cover 16 are a plurality of pages 18.

Album 10 is directed to a specific theme. For example, album 10 may be directed to a specific cartoon character or cartoon show. A story is set forth on pages 18 and quizzes, puzzles and similar items are also printed on pages 18. More specifically, referring to FIG. 2, a sample page 18 is illustrated. On the sample page 18 drawings of a cartoon character 20 corresponding to the theme of album 10 are printed. Surrounding the character 20 are a plurality of locations or designated areas 22. It is intended that a sticker 12 is secured to each of the areas 22. Printed at each of the designated areas 22 are photographic half tone images 24 (FIG. 7). These images 24 are a photographic half tone image of a full color still of a movie, cartoon, television program or the like. Images 24 are in one color, such as blue, for example, and may be scenes in a story told in album 10. Images 24 correspond to full color scenes 26 printed on the front side 28 of each sticker 12. Each scene 26 is different as is each image 24. By viewing image 24, a child gets a "sneak peek" at stickers yet to be collected. This "sneak peek" creates anticipation of getting those scenes in the full color sticker form. This anticipation adds play value to album 10.

In accordance with an important feature of the present invention, an entertaining aspect is provided by obscuring photographic half tone images 24 from view. To obscure images 24 from view, a pattern 30 is printed over and around each image 24. Pattern 30 is a mass of broken lines, dots and splotches and of a single color different from the color of images 24, such as red, that will make viewing each image 24 difficult.

In addition to pattern 30, each location or designated area 22 includes a sequential numeral 32 or other designation such as an alphabetical letter. Each number 32 corresponds to a number 34 printed on a liner 36 secured to the adhesive back 38 of each sticker 12. Liner 36 is waxed to allow easy separation from adhesive back-38 By matching the number 32 on a selected location 22 with the number 34 on a liner 36 of one of the stickers 12, a child may find the sticker 12 that corresponds to the photographic half tone image 24 at the selected location 22. By following this procedure, a child may find the proper sticker 12 from a packet of stickers for each location 22 in album 10.

Typically, however, a child will wish to confirm that the sticker 12 selected using this procedure in fact corresponds to the image 24 at the corresponding location 22. In other situations, the child may be too young to count and cannot enjoy album 10 since the child is unable to match the number 32 on each location 22 with the number 34 on each liner 36. Also, liner 36 may be lost or discarded and the child will not be able to determine where the sticker 12 is to be placed in the album 10. In each of these situations, the album 10 of the present invention provides a unique and entertaining feature. Album 10 includes a decoder 40 that allows a child to view image 24. By viewing image 24, the child can select a sticker 12 that includes a scene 26 corresponding to the image 24 being viewed.

Decoder 40 includes a viewer portion 42 and a checklist portion 44. Viewer portion 42 is joined to checklist portion 44 along a weakened line 46 that may be a line of perforations. Decoder 40 is fastened in album 10 between the front cover 14 and back cover 16 along the spine 48 of the album 10. Decoder 40 may be secured in this position by a fastener such as a staple. Pages 18 are then secured in album 10. Viewer portion 42 and checklist portion 44 may be removed by a child grasping either the viewer portion 42 or checklist portion 44 and pulling. This action will cause separation along weakened line 46 allowing the viewer portion 42 and checklist portion 44 to be removed separately from album 10.

Viewer portion 42 includes a frame 48 that is a square or rectangular piece of heavy paper or similar material with three sides 50, 52 and 54 weakened by perforations to form a flap or cover 56. By grasping an edge of flap 56, it can be lifted breaking the perforations and lifting flap 56 from frame 48. Flap 56 remains secured to frame 48 along a folded edge 58. Once the perforations are ruptured, flap 56 defines a handle that a child may hold while using viewer portion 42 (FIG. 7).

With flap 56 lifted from frame 48, an aperture or window 60 is defined. A sheet of film 62 such as cellophane is mounted on frame 48 over aperture 60. Film 62 is tinted approximately the same color as pattern 30. By being of the same color as pattern 30, film 62 acts to filter out the pattern 30 when viewed through film 62 and to enhance the color of images 24. Consequently, when each location or designated area 22 is viewed through film 62, the child sees image 24 (FIG. 7) and can match line image 24 with a corresponding full color scene 26 on one of the stickers 12. Viewing of images 24 is accomplished by placing film 62 on or slightly above a location or designated area 22. Once an image 24 that matches a scene 26 on a sticker 12 is found, liner 36 is peeled off of the adhesive back 38 of the proper sticker 12. Sticker 12 is then placed onto the location 22 with the correct image 24 and secured by the adhesive back 38. This procedure is repeated until all of the locations 22 have been covered by a sticker 12. Once all of the stickers 12 have been mounted in album 10, the child has a full color story book with a story told by scenes 26 and a written story 64 appearing beneath each location 22.

It is to be understood that a child can find the proper location 22 for each sticker 12 by matching designations 32 and 34. If this procedure is followed, viewer portion 42 still provides significant play value. Viewer portion 42 may be used by a child for a "sneak peek" at stickers still to be collected. This "sneak peek" creates anticipation of getting the missing full color stickers 12. Even if all stickers 12 are not collected, album 10 still has play value since the child still has access to images 24 by using viewer portion 42.

To provide an additional entertaining feature to album 10 and to allow for continued use of viewer portion 42 before, during and after all of the stickers 12 have been placed in album 10, there are provided screened line drawings 66 on pages 18. Drawings 66 may be words that answer a question or riddle, parts of a puzzle or a part of a picture. Drawings 66 are printed in the same color as photographic half tone images 24 and covered by patterns 30. The drawings 66 may be read by placing film 62 over pattern 30. By including drawings 66, a puzzle may be provided with answers to questions revealed using the viewer portion 42. Drawings 66 may also be a picture with portions obscured by a pattern 30 and by using viewer portion 42, the child can see the complete picture. Drawings 66 remain on album pages 18 even after all the stickers 12 have been put in album 10 and the play value continues even for the most avid sticker collector.

A favorite pastime of children is to collect and trade cards and similar items. Album 10 provides incentive to children to collect stickers 12 and to trade them. This incentive is provided through the checklist portion 44. Checklist portion 44 includes all the numbers or similar designations 32 printed on an area 68 on checklist portion 44. As each sticker 12 is collected, the child crosses off in area 68 of checklist portion 44 the number corresponding to the number 34 appearing on the liner 36 of sticker 12. Checklist portion 44 provides the child with a record of what stickers 12 still need to be collected to complete album 10.

Since checklist portion 44 is portable, a child can carry it and use it to trade stickers with friends in order to obtain a complete set of stickers 12. Without checklist portion 44, the child would have to refer to album 10 to determine which stickers 12 were still needed. Carrying album 10 would be cumbersome and would inhibit trading and collecting.

Many modifications and variations of the present invention are possible in light of the above teachings. Thus, it is to be understood that, within the scope of the appended claims, the invention can be practiced other than as specifically described in the above description.

What is claimed and desired to be secured by Letters Patent of the United States is:

1. A toy picture collection album, comprising:
an album including a front cover, a back cover and a plurality of pages secured between said front cover and said back cover,
each page of said plurality of pages includes at least one image, each said image being of at least one first color,
a pattern covering each said image, said pattern being of at least one second color,
a filter, said filter including a sheet of transparent film, said film tinted said second color, and
a collectible item, said collectible item including first and second sides, said first side including an illustration corresponding to said at least one image, means on said second side for securing said collectible item on to one of said plurality of pages over said at least one image.

2. The toy picture collection album set forth in claim 1 further comprising defined areas on said each page, said image and pattern being in said defined area, each said defined area including a first designation, a second designation on said collectible item, said second designation corresponding to said first designation.

3. The toy picture collection album set forth in claim 1 wherein said pattern is of a configuration and color to prevent seeing said at least one image with an unaided eye.

4. The toy picture collection album set forth in claim 1 further including at least one drawing on each said page, said drawing being of said first color, a second pattern over said drawing, said second pattern being of said second color.

5. The toy picture collection album set forth in claim 4 wherein said at least one drawing on each page being a one color screened line drawing and said illustration on said first side of said collectible item being full color.

6. The toy picture collection album set forth in claim 1 wherein said securing means on said second side of said collectible item includes adhesive on said second side and a peel-away liner over said adhesive.

7. The toy picture collection album set forth in claim 1 further comprising a frame, said filter mounted in said frame, said frame secured in said album, means on said frame for allowing removal of said frame from said album.

8. The toy picture collection album set forth in claim 7 wherein said frame includes a cover, a portion of said cover defining a handle.

9. The toy picture collection album set forth in claim 1 further comprising a frame, said frame including first and second portions, said first portion including means for recording each said collectible item, said second portion including said filter.

10. The toy picture collection album set forth in claim 9 further comprising means for separating said first and second portions.

11. A toy for collecting a plurality of stickers, comprising:

an album, said album including a cover, a plurality of pages secured in said cover, each said page including at least one drawing, said drawing printed on said pages in a first color, each page includes a obscuring pattern of a second color printed over each said drawing, said second color being different than said first color, each such page also including at least one photographic half tone image in said first color, obscuring pattern over each image, said obscuring pattern in said second color, means for filtering each said first and second pattern to allow viewing each said drawing and image, and a plurality of collectible stickers, each said sticker including a first side and a second side, an illustration on said first side corresponding to one of said images printed on said pages, adhesive material on said second side of each said sticker.

12. The toy for collecting a plurality of stickers claimed in claim 11 further comprising a designation adjacent to each said image printed on said pages, each said designation being different, a liner on said adhesive material, a designation on each said liner corresponding to one of said designations adjacent to each said image.

13. The toy for collecting a plurality of stickers claimed in claim 11 wherein said filtering means includes a sheet of transparent cellophane, said sheet being tinted of said second color, a frame including first and second portions, said sheet mounted in said first portion, a handle on said first portion, a plurality of designations corresponding to said designations adjacent to each said image on said second portion, and means for removably securing said frame in said album.

14. A method for securing stickers bearing an illustration in the proper location in a sticker collection album wherein said album includes pages with photographic half tone images of each illustration printed thereon in a first color, and a image obscuring pattern printed over each image in a second color, the steps comprising:

placing a transparent film of said second color over a selected one of said patterns viewing said image under said pattern, matching an illustration on one of said stickers with said image, and securing said sticker over the selected pattern and image.

15. The method for securing stickers in a collection album claimed in claim 14 further comprising the step of recording each said sticker secured over said selected pattern and image.

* * * * *